Dec. 29, 1936.   J. A. ZUBLIN ET AL   2,066,025
METHOD OF MAKING A METAL TUBE
Filed July 24, 1935

John A. Zublin
Charles W. Hitt
Inventors

Attorney

Patented Dec. 29, 1936

2,066,025

UNITED STATES PATENT OFFICE 2,066,025

METHOD OF MAKING A METAL TUBE

John A. Zublin and Charles W. Hitt, Los Angeles, Calif.; said Hitt assignor to said Zublin Application July 24, 1935, Serial No. 32,908

6 Claims. (Cl. 113—33)

The present invention is concerned generally with metal tubes and their manufacture, especially tubes made from relatively thin sheet metal. These tubes may be put to a variety of uses, such as containers, light structural members, and so on, and may be of any suitable size and shape.

In the manufacture of tubes from sheet metal considerable difficulty has heretofore arisen in sealing the joint where the longitudinal edges of the sheet come together. A soldered joint lacks strength, melts at relatively low temperatures, and is difficult to form, so that it is an obstacle to production of tubes on a commercial scale. Welding produces a very satisfactory joint, but when working with thin stock only a few thousandths of an inch thick it is impossible to weld a lap or butt joint without often burning entirely through the metal; and naturally the thinner the material the more easily it is burned through. Tubes with holes burned in them are a complete loss, and cannot be salvaged.

Thus it becomes a general object of our invention to provide a tube made from thin sheet metal and having a satisfactory seam closing the tube.

Another object of our invention is to close the tube with a seam that can be sealed rapidly and easily to permit quantity production of tubes.

A further object of the invention is to provide a tube with a seam that can be welded, even though the walls of the tube are so thin that they will be burned through by any direct exposure to a welding flame.

Another object is to provide a thin-wall tube with external reinforcements to strengthen the tube against bending or buckling.

These objects are accomplished in a tube embodying the invention by shaping a sheet of metal to form a tube and bringing together the opposite longitudinal edges of the metal sheet to form an upstanding seam, preferably running lengthwise of the tube. These edge portions of the sheet are in contact and extend outwardly beyond the tube for a short distance amounting to several times the thickness of the tube walls, so that the upstanding seam forms a narrow ridge of metal having sufficient thickness or depth that a welding flame may be applied thereto to form a welded joint without burning away all the metal.

How the above and other objects and advantages of the invention are attained will be more readily apparent from the following description and the annexed drawing, in which.

Figure 1:
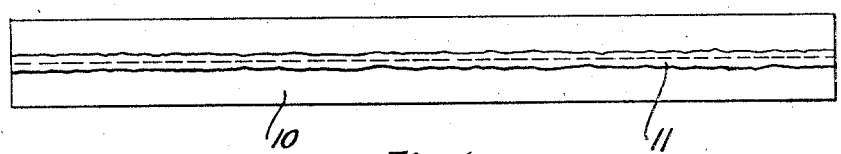
Fig. 1 is a plan view of a completed tube, with the seam on top.
Figure 2:
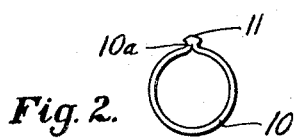
Fig. 2 is an end view of the tube of Fig. 1.

The tube shown in Figs. 1 and 2 is made from a single sheet or strip of metal, and comprises a wall portion 10 and an upstanding seam 11 formed by the two edge portions 10a of the metal strip, these edge portions being welded together to form the longitudinal joint.

Figure 4:
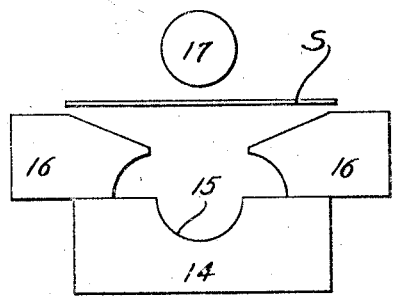
Fig. 4 is an end elevation showing diagrammatically apparatus for forming the tube and holding the edges together during the welding step, the sheet of metal being shown before bending.
Figure 5:
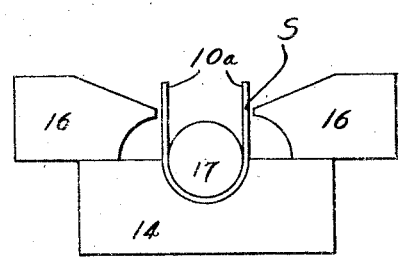
Figs. 5 and 6 are views similar to Fig. 3, showing later steps in making the tube.
Figure 6:
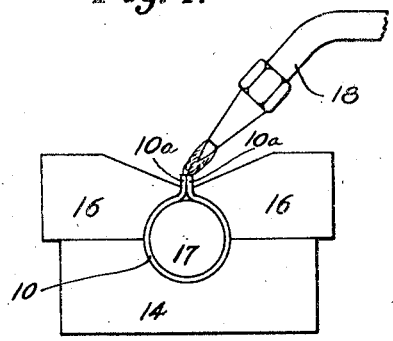

Although any suitable apparatus may be used to manufacture the tube, Figs. 4 to 6 show diagrammatically portions of a typical tube forming device described in detail in Charles W. Hitt's copending application entitled "Apparatus for making tubes", Ser. No. 32,934 filed on even date herewith. This apparatus comprises die block 14 with a forming groove 15 in the top face, and movable forming members 16, which slide toward and away from each other over the top face of block 14. Since any suitable mechanism may be used to actuate the forming members, none is shown here. The tube is bent to a predetermined shape around mandrel or core 17. Formers 16 and mandrel 17 may be of any desired configuration in order to impart to the tube the desired predetermined shape, which is here shown as cylindrical, though the invention is not necessarily limited to any one shape.

The thin sheet of metal S (the thickness of which is exaggerated in the drawing for purposes of illustration) from which the tube is to be made is placed in a position overlying the forming block and groove 15 as shown by Fig. 4. The first step in bending the sheet to its tubular shape about the mandrel is accomplished by pressing the sheet into groove 15 by mandrel 17, as shown by Fig. 5, thus bending the strip into a U-shape with generally parallel upstanding sides. Next the sheet is completely bent around the mandrel by forming members 16 which move toward each other to the position of Fig. 6. The portion around the mandrel forms the wall 10 of the tube. As the tube is formed around the mandrel, the two opposite longitudinal edge portions of the metal strip are bent to form flanges 10a which are integral with the tube wall 10 and project outwardly beyond the wall after it is bent to its predetermined shape. As shown by Fig. 6, flanges 10a normally project substantially radially beyond the tube, and lie in parallel planes. The flanges, or edge portions, are preferably brought into contact with each other and held in this position by forming members 16, because welding them together is thus facilitated.

While held in contact by members 16, the upstanding edge portions 10a are simultaneously melted down and welded together by running a small welding flame from a welding torch 18 along the upstanding seam 11 extending lengthwise of the tube. Flanges 10a extend a short distance above forming members 16, and this material melts down to form the bead of the welded seam. While held in contact, the flame cannot penetrate between the flanges; and the thickness of the metal (measured radially of the tube) presented to the flame by the seam and the rapid heat transfer from the base of the seam by forming members 16, prevent perforation of the tube by burning up the metal at the joint. The tube wall 10 is fully covered by formers 16 and is so protected against the welding flame.

If the tube of Fig. 1 is used as a container of granular material, the ends of the tube are closed in any suitable way, as by crimping, to retain the granular substance within the tube.

Figure 3:
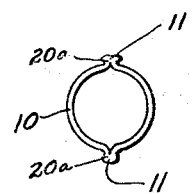
Fig. 3 is an end view of a variational form of tube.
Figure 7:
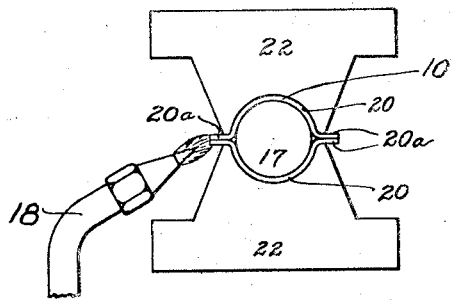
Fig. 7 is an end elevation showing diagrammatically apparatus for forming a tube from two sheets.

Although for simplicity it is preferred to make a tube from only a single sheet, it will be obvious that a similar tube may be formed by using more than one sheet of material. For example, two, three, or even more sheets may be used and joined together by a corresponding number of welded seams. One such variational form is shown in Fig. 7, in which the wall 10 of the tube is formed in two parts by two sheets 20, and each pair of adjoining edges 20a is brought together and welded by torch 18, in the manner previously described, to form two welded seams 11, the sheets being shaped and held by suitable forming members 22. The finished tube appears as in Fig. 3.

Figure 8:
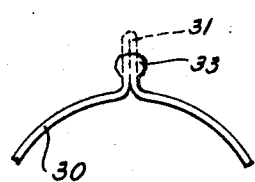
Fig. 8 is a fragmentary end elevation of a reinforced tube member.

A tube can be formed from a single sheet of material and provided with more than one seam, the several seams acting as longitudinal reinforcements which strengthen the tube against bending or buckling. Fig. 8 shows part of a tube 30 with one such reinforcing seam. The sheet is first formed with a double thickness portion 31 extending away from the tube, the double thickness portion being formed by bending the sheet material back on itself. This double thickness portion may be formed in any suitable manner, as, for example, in a die of the type shown in Fig. 7 permitting the formation and exposure for welding of more than one fold or seam at once, a single sheet being used in place of the plurality of sheets shown. Just as shown and described in connection with Figs. 6 and 7, the two thicknesses are held together and melted down by a torch, thus forming a bead 32 which welds the two thicknesses together and acts as a reinforcement longitudinally of the tube. In addition to the closing seam, as many reinforcements 33 as desired may be added.

Tubes of the character described can be formed of sheets too thin to be handled by the usual apparatus. The advantages of these tubes and the above method of making them will be emphasized when it is understood that tubes can be made economically and successfully from stock as thin as .001 inch, whereas any attempt to form a tube from such thin stock and seal it with a lap weld will inevitably result in perforating the tube wall, because such thin stock burns almost like paper when exposed to a welding flame.

Since various changes in the tube and its method of manufacture may be made without departing from the spirit and scope of our invention, it is desired that the foregoing description be considered as illustrative of, rather than restrictive, upon the appended claims.

We claim as our invention:

1. The method of forming a tube from relatively thin sheet metal, that includes bending the central longitudinal portion of a flat strip of metal for its full length into a tubular shape, bending the two edge portions of the strip for its full length on either side of said central portion into positions extending outwardly away from the tube portion, bringing said two edge portions into parallel contacting position, and welding together the edge portions only while the edge portions are held parallel and in contact by progressively moving a welding flame over the two edge portions and at the same time protecting the tube portion from the welding flame.

2. The method of forming a tube from relatively thin sheet metal, that includes bending a flat strip of metal around a mandrel to form a tubular portion of corresponding shape, bending portions adjacent opposite longitudinal edges of the strip to form flanges extending outwardly from said tubular portion in parallel planes, maintaining said parallel flanges in contact, welding together the contacting flanges only to close the tube while shielding the tube from the welding flame, and removing the mandrel from inside the finished tube.

3. The method of forming a tube from relatively thin sheet metal, that includes bending a flat strip of metal to form a tubular portion of predetermined shape, bending a portion intermediate the longitudinal edges of the strip to form a double thickness flange portion extending outwardly from said tubular portion with the two thicknesses in contact and in parallel planes, maintaining said two thicknesses in contact, and simultaneously melting down and welding together the contacting thicknesses to form an external reinforcement extending longitudinally of the tube.

4. The method of forming a tube from relatively thin sheet metal, that includes bending a flat strip to form a U-strip with generally parallel upstanding sides, bending the U-strip about a mandrel to form a completed tube of a corresponding shape and to bring portions of the parallel sides of the U-strip into contact while still parallel, and welding together the contacting portions longitudinally of the tube.

5. The method of forming a tube from relatively thin sheet metal, that includes bending a flat strip into a U-strip with generally parallel upstanding sides, filling the strip with materials to be enclosed within the container, bending the U-strip about said materials to form a completed tube and to bring portions of the parallel sides of the U-strip into contact while still parallel, and welding together the contacting portions longitudinally of the tube.

6. The method of making a tube from a thin metal sheet of insufficient thickness to permit welding by a flame applied to the face of the sheet, that includes shaping the metal sheet to form a tube wall, bringing into contact longitudinally extending flange portions of the wall projecting outwardly away from the wall, melting down and welding together said contacting flange portions by a flame applied to the edge of the sheet to form a welded seam extending lengthwise of the tube, and at the same time protecting the tube portion from contact with the welding flame.

JOHN A. ZUBLIN.
CHARLES W. HITT.